US006420016B1

(12) United States Patent
Peternell et al.

(10) Patent No.: US 6,420,016 B1
(45) Date of Patent: Jul. 16, 2002

(54) RECORDING SHEETS FOR INK JET PRINTING

(75) Inventors: Karl Peternell, Fribourg; Rolf Steiger, Praroman, both of (CH)

(73) Assignee: Ilford Imaging Switzerland GmbH (CH)

( * ) Notice: Subject to any disclaimer, the term of this patent is extended or adjusted under 35 U.S.C. 154(b) by 0 days.

(21) Appl. No.: 09/360,886

(22) Filed: Jul. 23, 1999

(30) Foreign Application Priority Data

Jul. 23, 1998 (EP) ........................................... 98810711

(51) Int. Cl.[7] ................................................. B32B 3/00
(52) U.S. Cl. ..................... 428/195; 428/212; 428/478.2
(58) Field of Search ............................. 428/195, 478.2, 428/212

(56) References Cited

U.S. PATENT DOCUMENTS 4,642,247 A * 2/1987 Mouri et al. ................ 427/214
4,680,235 A * 7/1987 Murakami et al. ....... 428/414.4
4,954,395 A * 9/1990 Hasegawa et al. ....... 428/318.4
5,677,067 A * 10/1997 Kojima et al. ........... 428/478.2
5,877,796 A * 3/1999 Tsuchiya et al. ............ 347/105

FOREIGN PATENT DOCUMENTS

DE 44 33 077 11/1995 ............ B41M/5/00
EP 0 559 324 9/1993 ........... C09D/11/00
EP 0 698 763 8/1994 ............ B41M/5/00

* cited by examiner

*Primary Examiner*—Bruce H. Hess
*Assistant Examiner*—Michael E. Grendzynski
(74) *Attorney, Agent, or Firm*—Dara L. Onofrio, Esq.; Onofrio Law

(57) ABSTRACT

A recording sheet for ink jet printing comprising a support having coated onto said support at least one ink receiving layer and a gelatin containing absorption layer, characterized in that the absorption layer is situated between the support and the ink receiving layer and that it comprises a micelle forming compound selected from salts of branched or unbranched alkyl sulfates of formula $C_nH_{2n+1}OSO_3H$, wherein n is from 5 to 25;

salts of branched or unbranched alkyl phosphates of formula $C_nH_{2n+1}OPO_3H_2$, wherein n is from 5 to 25;

substituted phenols of general formula (I)

(I)

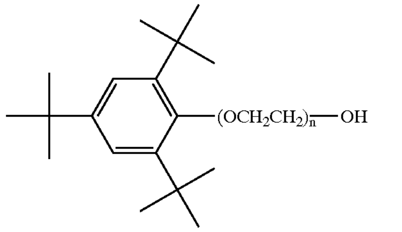

wherein n is from 18 to 50;

or salts of substituted phenols of general formula (II)

(II)

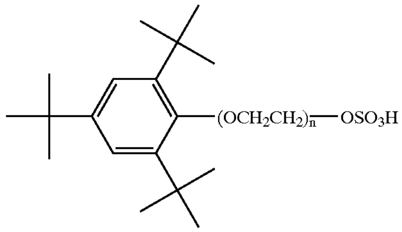

wherein n is from 5 to 55.

9 Claims, No Drawings

RECORDING SHEETS FOR INK JET PRINTING

FIELD OF THE INVENTION

This invention relates to recording sheets suitable for use in an ink jet printing process, where inks consisting of at least one dye and an ink liquid are used, and to coating compositions for the preparation of ink receiving layers for this process. It relates especially to recording sheets where the image recorded thereon can be observed by both reflected or transmitted light and where the ink receiving system consists of a support onto which are coated at least two layers.

BACKGROUND OF THE INVENTION

In the ink jet printing process droplets of a recording liquid (ink) are placed on the surface of a recording sheet using different methods. Ink jet printing processes are of two types: continuous stream and drop-on-demand.

In continuous stream ink jet printing systems, ink is emitted in a continuous stream under pressure through a nozzle. The stream disintegrates at a certain distance from the nozzle, due to the effect of surface tension, into individual, microscopically small droplets. The individual droplets are charged electrically and deflected in an electric field according to digital data signals in order to direct them to a specific location on a recording medium or a gutter for recirculation.

In the non-continuous process, or the so called "drop-on-demand" systems, an image signal induces a droplet to be expelled from the nozzle. At present the thermal process (thermal jet or bubble jet) is mostly used. In this process the image signal activates a heating element, a vapor bubble is formed in the aqueous ink that ejects the droplet from the nozzle. Most recently the piezoelectric effect is used again which ejects the droplets mechanically from the nozzle.

Available recording sheets for ink jet printing do not meet all the necessary requirements asked for today. There is a need to further improve their ink absorbency, ink absorption rate, drying speed, image quality as well as their light and water fastness.

Recording sheets for ink jet printing, particularly the so called "photo feel" materials, must meet a number of stringent demands. "Photo feel" means that such an image, printed in an ink jet printing process, feels like a photographic silver halide material when touched. The printed image has to fulfill the following properties:

High resolution

High color density

Good color reproduction

High resistance to rubbing

Good water fastness

"Photo feel"

High light stability

No tackiness

The following conditions have to be met to attain these goals:

1. The ink needs to be absorbed quickly into the recording sheet to attain short drying times.
2. The jetted ink droplets have to spread circularly on the recording sheet and have to form well defined edges.
3. Dye diffusion in the recording sheet has to be low so that the diameter of the color points is not increased more than necessary.
4. An ink droplet is not allowed to interfere with a droplet deposited earlier nor should it blur it.
5. The recording sheet needs to have a surface that gives high color density and brilliance and shows "photo feel".
6. The recording sheet has to show excellent physical properties before and after printing.

These requirements are partly in contradiction to each other. For example a very rapid ink absorption rate may reduce the resistance to rubbing. A "photo feel" surface may show the problem that printed images stick to overhead transparency protectors. In the case of wet sticking a liquid film consisting of ink components is formed between the surface of the image and the overhead transparency protector. This leads to blots, dye transfer to the foil of the overhead transparency protector and in extreme cases even to a separation of the coated layers from the support when the recording sheet is removed from the overhead transparency protector. In the case of dry sticking, which is relevant only in the absence of wet sticking, adhesion between the image and the overhead transparency protector is increased, leading to a whispering noise during separation of the recording sheet from the overhead transparency protector and layer damages.

The steadily increasing performance of ink jet printers resulting in ever higher recording speeds makes it even more difficult to attain these requirements.

Starting with these requirements for receiving sheets for ink jet printing ways are sought that should result in images showing high color densities combined with high resistance to rubbing at the surface, short drying times and "photo feel" without sticking problems in overhead transparency protectors.

Recording sheets having the "photo feel" property normally consist of a support that can not absorb liquids, as for example polyester films or polyethylene coated papers. This, however, leads to long drying times.

To achieve rapid drying the ink liquid has to be drained away quickly from the surface of the recording sheets and it has to be fixed below the surface of the receiving sheet.

Accordingly an object of the present invention is to provide recording sheets for ink jet printing which show high gloss, "photo feel" without sticking to overhead transparency protectors and short drying times for the ink liquids as well as high color densities and high resolution.

SUMMARY OF THE INVENTION

The invention proposes to achieve these objectives by providing a recording sheet for ink jet printing comprising a support, onto which are coated, in addition to optional auxiliary layers, at least one gelatin containing absorption layer for the fixation of the ink liquid and on top of the absorption layer one or more ink receiving layers, characterized in that the gelatin containing absorption layer comprises micelle forming compounds in a quantity from 10% by weight to 50% by weight relative to gelatin.

The invention is directed towards recording sheets that may be used in both recording processes.

An objective of the invention is to provide recording sheets for ink jet printing showing high ink absorbency, high ink absorption rate, excellent image quality, short drying times and "photo feel".

A further objective of the invention is the preparation of recording sheets for ink jet printing with the property that the printed sheets do not stick together even under conditions of high humidity, that they may be stored in overhead transparency protectors without wet or dry sticking and that the image quality does not deteriorate even after long periods of storage.

A preferred embodiment of the invention relates to recording sheets for ink jet printing showing excellent image quality, high ink absorbency and short drying times. In particular recording sheets for ink jet printing with "photo feel" are looked for where the printed images show high resistance to rubbing at the surface and where the images are not altered or destroyed even under the influence of water or light.

The invention is explained in detail in the following description.

DETAILED DESCRIPTION OF THE INVENTION

The invention describes recording sheets for ink jet printing comprising a support, onto which are coated, in addition to optional auxiliary layers, at least one gelatin containing absorption layer for the fixation of the ink liquid and on top of the absorption layer one or more ink receiving layers, characterized in that the gelatin containing absorption layer comprises micelle forming compounds.

Salts of branched or unbranched alkyl sulfates of formula $C_nH_{2n+1}OSO_3H$, wherein n is from 5 to 25;

salts of branched or unbranched alkyl phosphates of formula $C_nH_{2n+1}OPO_3H_2$, wherein n is from 5 to 25;

substituted phenols of general formula (I)

(I)

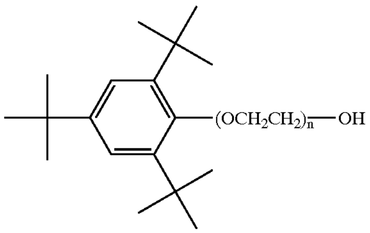

wherein n is from 18 to 50;

or salts of substituted phenols of general formula (II)

(II)

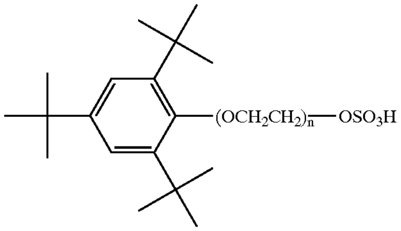

wherein n is from 5 to 55;

are used as micelle forming compounds.

Preferred are salts of unbranched alkyl sulfates of formula $C_nH_{2n+1}OSO_3H$, wherein n is from 8 to 16, as well as salts of unbranched alkyl phosphates of formula $C_nH_{2n+1}OPO_3H_2$, wherein n is from 8 to 20.

Especially preferred is the alkyl sulfate of formula $C_{12}H_{25}OSO_3^-M^+$, wherein M is a metal cation as for example Na, K, Mg/2, Ca/2, Ba/2, La/3 or the like.

The absorption layer contains the micelle forming compounds in a quantity of 10% by weight to 50% by weight relative to gelatin. Quantities of 15% by weight to 45% by weight relative to gelatin are preferred. Especially preferred are quantities of 20% by weight to 40% by weight relative to gelatin.

The absorption layers contain gelatin as the principal binder. All known types of gelatin may be used as for example acid pigskin or limed bone gelatin, acid or base hydrolyzed gelatin, but also derivatized gelatins like for instance phthalaoylated, acetylated or carbamoylated gelatin or gelatin derivatized with the anhydride of trimellytic acid. A limed bone gelatin is the preferred gelatin.

The absorption layer may contain, in addition to gelatin, other polymers as for example casein, starch, gum arabicum, sodium or potassium alginate, hydroxyethyl-cellulose, methylhydroxypropylcellulose, carboxymethylcellulose, α-, β- or γ-cyclo-dextrine, polyvinyl alcohol, copolymers of vinyl alcohol and vinyl amine, polyvinyl pyrrolidone and the like in quantities up to 30% by weight relative to gelatin.

The absorption layer preferably has a dry thickness in the range of 3 to 20 μm. Especially preferred is a dry thickness in the range of 5 to 15 μm.

A recording sheet according to our invention comprises normally a support onto which are coated the absorption layer and on top of the absorption layer at least one ink receiving layer and, optionally, auxiliary layers.

A wide variety of supports are known and commonly employed in the art. They include all those supports used in the manufacture of photographic materials. This includes clear films made from cellulose esters such as cellulose triacetate, cellulose acetate, cellulose propionate or cellulose acetate butyrate, polyesters such as poly(ethylene terephthalate), polyamides, polycarbonates, polyimides, polyolefins, poly(vinyl acetals), polyethers, polyvinyl chloride and polyvinylsulfones. Polyester film supports, and especially poly(ethylene terephthalate) are preferred because of their excellent dimensional stability characteristics. The usual supports used in the manufacture of opaque photographic material can be used including for example baryta paper, polyethylene coated papers, voided polyester as for instance MELINEX® manufactured by ICI. Especially preferred are resin coated paper or voided polyester.

When such a support material, in particular polyester, is used a subbing layer is advantageously added first to improve the bonding of the ink receiving layers to the support. Useful subbing compositions for this purpose are well known in the photographic art and include for example terpolymers of vinylidene chloride, acrylonitrile and acrylic acid or of vinylidene chloride, methyl acrylate and itaconic acid.

Also used as supports are plain paper, comprising all different types of papers varying widely in their composition and in their properties. Pigmented papers and cast coated papers can be used as well as metal foils, such as foils made from alumina.

The ink receiving layer may be a monolayer or a multilayer. It may incorporate binders, dye fixing agents, pigments, fillers and other auxiliary compounds as for example dispersing agents, crosslinking agents, defoamers or pH regulating agents. Ink receiving layers normally are hydrophilic layers well suited to absorb aqueous inks.

Dye fixing agents are for example quaternary ammonium polymers as for example salts of polyammonium methacrylate or polydiallylmethylammonium or salts of metals of valence of at least 2, in particular metal salts of the rare earth metal series.

Binders normally used are water soluble polymers. Especially preferred are film forming polymers.

These water soluble polymers may include for example natural polymers or modified products thereof such as albumin, gelatin, casein, starch, gum arabicum, sodium or potassium alginate, hydroxyethylcellulose, carboxymethylcellulose, β-, β- or γ-cyclodextrine and the like. In the case where one of the water soluble polymers is gelatin, all known types of gelatin may be used as for example acid pig-skin or limed bone gelatin, acid or base hydrolyzed gelatin, but also derivatized gelatins like for instance phthalaoylated, acetylated or carbamoylated gelatin or gelatin derivatized with the anhydride of trimellytic acid. A preferred natural binder is gelatin.

Synthetic polymers are also used and include for example polyvinyl alcohol; completely or partially saponified products of copolymers of vinyl acetate and other monomers; homopolymers of or copolymers of unsaturated carboxylic acids such as (meth)acrylic acid, maleic acid, crotonic acid and the like; homopolymers of or copolymers of sulfonated vinyl monomers such as vinylsulfonic acid, styrene sulfonic acid and the like. Furthermore homopolymers of or copolymers with vinyl monomers of (meth)acrylamide; homopolymers or copolymers of other monomers with ethylene oxide; polyurethanes; polyacrylamides; water soluble nylon type polymers; polyvinyl pyrrolidone; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; methacrylamide copolymers and maleic acid copolymers can be used. All these polymers can also be used as mixtures. A preferred synthetic binder is polyvinyl alcohol.

These polymers can be blended with non water soluble natural or synthetic high molecular compounds, particularly with acrylate latices or with styrene acrylate latices.

Polymers soluble in organic solvents may also be used as binders, as for example polyvinyl butyral, polyvinyl acetate, polyacryl nitrile, polymethyl methacrylate, melamine resins and the like.

The polymers mentioned above having groups with the possibility of reacting with a crosslinking agent can be crosslinked or hardened to form essentially non water soluble layers. Such crosslinking bonds may be either covalent or ionic. Cross-linking or hardening of the layers allows for the modification of the physical properties of the layers, like for instance in water absorbency of the layer or in resistance against physical damage.

The crosslinking agents or hardeners are selected depending on the water soluble polymers used.

Organic crosslinking agents and hardeners include for example aldehydes (such as formaldehyde; glyoxal or glutaraldehyde); N-methylol compounds (such as dimethylol urea or methylol dimethylhydantoin); dioxane derivatives (such as 2,3-dihydroxy dioxane); reactive vinyl compounds (such as 1,3,5-trisacrylolyl hexahy-dro-s-triazine or bis-(vinylsulfonyl) methyl ether); active halogen compounds (such as 2,4-dichloro-6-hydroxy-s-triazine); epoxides; aziridines; carbamoyl pyridinium compounds or mixtures of two or more of the above mentioned crosslinking agents.

Inorganic crosslinking agents or hardeners include for example chromium alum, aluminum alum or boric acid.

The layers may also contain reactive compounds that crosslink the layers under the influence of UV light, electron beams, X-ray beams or heat.

The layers can be further modified by the addition of fillers. Possible fillers used are for instance kaolin, talcum, Ca- or Ba-carbonates, silica, titanium dioxide, bentonite, zeolite, aluminum silicate, calcium silicate or colloidal silicium dioxide. It is also possible to use organic inert particles such as polymer beads. These beads may consist of polyacrylates, polyacrylamides, polystyrene or different copolymers of acrylates and styrene.

The different layers of recording sheets are in general coated from aqueous solutions or dispersions containing all necessary ingredients. In many cases surfactants are added to those coating solutions or dispersions allowing for smooth coating and evenness of the layers.

Besides being necessary for coating purposes these compounds may have an influence on the image quality and may therefore be selected with this specific goal in mind. Although not specifically claimed in this invention surfactants nevertheless form an important part of the invention.

In addition to the above mentioned elements recording sheets as claimed in this invention may contain additional additives aimed at further improving its performance, as for example brightening agents to improve the whiteness, such as stilbenes, coumarines, triazines, oxazoles or others compounds known to someone skilled in the art.

Light stability can be improved by adding UV absorbers such as benzotriazoles, benzophenones, thiazolidones, oxazoles, thiazoles and other compounds known to someone skilled in the art. The amount of UV absorber can vary from 200–2000 mg/$m^2$, preferably from 400–1000 mg/$m^2$. The UV absorbers may be added to any of the layers of the recording sheets of the invention. It is preferred however if they are added, that the UV absorbers are included in the topmost layer of the system.

It is further known that images produced by ink jet printing can be protected from degradation by the addition of light stabilizers and antioxidants. Examples of such compounds are sterically hindered phenols, sterically hindered amines, chromanols and the like. The above mentioned additives can be added as aqueous solutions to the coating solutions. In the case where these compounds are not water soluble they can be incorporated into the coating solutions by other common techniques known in the art. The compounds may be for example dissolved in a water miscible solvent such as lower alcohols, glycols, ketones, esters or amides. Alternatively the compounds can be added to the coating solutions as fine dispersions, as oil emulsions, as cyclodextrine inclusion complexes or incorporated into latex particles.

The coating solutions or coating dispersions can be coated onto a support by any number of suitable procedures. Usual coating methods include extrusion coating, air knife coating, doctor blade coating, cascade coating or curtain coating. The coating solutions may also be applied using spray techniques. The ink receiving layers can be built up from several single layers that can be coated one after the other or simultaneously. It is likewise possible to coat a support on both sides with ink receiving layers. It is also possible to coat an antistatic layer or an anticurl layer on the backside. The method however by which the claimed ink receiving layers are produced is not to be considered limiting for the present invention.

Inks for ink jet printing consist in essence of a liquid vehicle and a dye or pigment dissolved or suspended therein. The liquid vehicle for inks employed for ink jet printing consists in general of water or a mixture of water and a water miscible organic solvent such as ethylene glycol, higher molecular weight glycols, glycerol, dipropylene glycol, polyethylene glycol, amides, polyvinyl pyrrolidone, N-methyl-pyrrolidone, cyclohexyl pyrrolidone, carboxylic acids and their esters, ethers, alcohols, organic sulfoxides, sulfolane, dimethylformamide, dimethylsulfoxide, cellosolve, acrylates, polyurethanes and the like. The non water parts of the ink generally serve as humefactants, cosolvents, viscosity regulating agents, ink penetration additives or drying agents. The organic components have in most cases a boiling point which is higher than that of water. In addition aqueous inks used for printers of the continuous flow type may contain inorganic or organic salts to increase electric conductivity. Examples of such salts include nitrates, chlorides, phosphates and water soluble salts of organic acids like acetates, oxalates and citrates. The dyes and pigments suitable for the preparation of inks useable with the recording sheets of the invention cover practically all classes of known coloring compounds. Dyes or pigments typically used for this purpose are described in patent application EP 0,559,324. The recording sheets according to this invention are meant to be used in conjunction with most of the inks representing the state of the art.

Other additives present in inks are for instance surface active compounds, optical brighteners, UV absorbers, light stabilizers, biocides and polymeric additives.

This description of the inks is for illustration only and is not to be considered as limiting for the purpose of the invention.

Image Preparation

Wedges with 10 color steps were printed onto the recording sheets according to the invention, as described later on in the examples, with an ink jet printer HP 660 C. using original inks. In step 1 the primary colors cyan, magenta, yellow, red, green and blue were printed at maximum density. Subsequently the missing colors were printed in steps 2 to 10 in increments of 10%, resulting in 3K black (mixture of yellow, magenta and cyan) in step 10 everywhere.

The recording sheets printed in this way were dried for one hour at room temperature, then conditioned for 16 hours at a temperature of 22° C. and relative humidity of 60% and put into overhead transparency protectors manufactured by 3M company. The trapped air between the recording sheets and the foil of the overhead transparency protectors was removed by a pair of rollers.

The following test procedures were used to evaluate the properties of the recording sheets described in the present invention and of recording materials that are state of the art:

Wet Sticking

The number of color patches, where increased adhesion or sticking between the recording sheet and the foil of the overhead transparency protectors occurred, was determined by optical means. Ranking grades are from 0 (no contact, no sticking to the foil, excellent) to 70 (contact everywhere, extremely strong wet sticking, very bad).

Dry Sticking

The overhead transparency protectors and the image therein were separated by slight pulling. Dry sticking is characterized by grades from 1 (no dry sticking) to 4 (extreme dry sticking). In the presence of wet sticking dry sticking can not evaluated.

EXAMPLES

Example 1

The following double layer system (Table 1) was coated onto a transparent polyester support (A=absorption layer at the bottom, F=dye receiving layer at the top) and dried for 60 minutes at a temperature of 300° C. Olin 10 G, available from Olin Corporation, Norwalk, US, was used as wetting agent. As gelatin a limed bone gelatin, available from Deutsche Gelatinefabriken, Eberbach, Germany was used. A mixture of Culminal 100 and Culminal 50, both available from Aqualon, Wilmington, US was used as methylhydroxypropylcellulose. The value of pH of layer A was adjusted to 7.5 and the value of pH of layer F to 9.0.

TABLE 1

| Component | A | F |
|---|---|---|
| Gelatin (St 66060) (g/m$^2$) | 7.0 | 2.09 |
| Sodium lauryl sulfate (g/m$^2$) | 1.4 | |
| Methylhydroxypropylcellulose (g/m$^2$) | | 3.13 |
| Wetting agent (g/m$^2$) | 0.15 | 0.04 |

Comparative Examples C-1, C-2 and C-3

Comparative example C-1 uses a pure gelatin layer comprising 8.4 g/m$^2$ of gelatin as absorption layer A and the same ink receiving layer F as in example 1. This comparative example does not contain any sodium lauryl sulfate.

Comparative example C-2 uses as absorption layer A a layer with the same composition as the ink receiving layer F, comprising 3.36 g/m$^2$ of gelatin and 5.04 g/m$^2$ of methylhydroxypropylcellulose. The ink receiving layer is the same as in example 1. This means that both layers have the same composition (equivalent to layer F of example 1). This comparative example too does not contain any sodium lauryl sulfate.

Comparative example C-3 uses as ink receiving layer F a layer with the same composition as the absorption layer A, comprising 4.35 g/m$^2$ of gelatin and 0.87 g/m$^2$ of sodium lauryl sulfate. The absorption layer is the same as in example 1. This means that both layers have the same composition (equivalent to layer A of example 1).

The test results for these recording sheets are listed in Table 2:

TABLE 2

| Example | Wet sticking | Dry sticking |
|---|---|---|
| 1 | 0 | 1 |
| C-1 | 66 | |
| C-2 | 65 | |
| C-3 | 64 | |

The results in Table 2 immediately show that only example 1 according to the invention does not show wet sticking. The comparative examples C-1, C-2 and C-3 show severe wet sticking. Example 1 according to the invention does not show dry sticking as well.

Example 2

The following double layer system (Table 3) was coated onto a transparent polyester support (A=absorption layer at the bottom, F=dye receiving layer at the top) and dried for 60 minutes at a temperature of 30° C. As gelatin a limed bone gelatin, available from Deutsche Gelatinefabriken, Eberbach, Germany was used. Polyvinyl alcohol, available from ALDRICH Chemie, Buchs, Switzerland, of hydrolysis degree 98% to 99% and of molecular weight 85,000 to 146,000 was used. The value of pH of both layers was adjusted to 6.0.

TABLE 3

| Component | A | F |
|---|---|---|
| Gelatin (St 69454) ($g/m^2$) | 7.0 | |
| Sodium lauryl sulfate ($g/m^2$) | 1.4 | |
| Polyvinyl alcohol ($g/m^2$) | | 3.13 |
| Olin 10 G ($g/m^2$) | 0.15 | 0.04 |

Comparative Examples C-4 and C-5

Comparative example C-4 uses a pure gelatin layer comprising 8.4 $g/m^2$ of gelatin as absorption layer A and the same ink receiving layer F as in example 2. This comparative example does not contain any sodium lauryl sulfate.

Comparative example C-5 uses as absorption layer A a layer with the same composition as the ink receiving layer F. comprising 8.4 $g/m^2$ of polyvinyl alcohol. The ink receiving layer is the same as in example 2. This means that both layers have the same composition (equivalent to layer F of example 2). This comparative example too does not contain any sodium lauryl sulfate.

The test results for these recording sheets are listed in Table 4:

TABLE 4

| Example | Wet sticking | Dry sticking |
|---|---|---|
| 2 | 0 | 4 |
| C-4 | 64 | |
| C-5 | 69 | |

The results in Table 4 immediately show that example 2 according to the invention shows much less wet sticking than the comparative examples C-4 and C-5.

Example 3

The following double layer system (Table 5) was coated onto a transparent polyester support (A=absorption layer at the bottom, F=dye receiving layer at the top) and dried for 60 minutes at a temperature of 300° C. As gelatins a limed bone gelatin (St 69454) and an acid pig skin gelatin (St 71862), both available from Deutsche Gelatinefabriken, Eberbach, Germany were used. Blanose 7L1, available from Aqualon, Wilmington, US was used as carboxymethylcellulose. The value of pH of layer A was adjusted to 7.5 and the value of pH of layer F to 7.0.

TABLE 5

| Component | A | F |
|---|---|---|
| Gelatin (St 69454) ($g/m^2$) | 7.0 | |
| Gelatin (St 71862) ($g/m^2$) | | 1.325 |
| Sodium lauryl sulfate ($g/m^2$) | 1.4 | |
| Carboxymethylcellulose ($g/m^2$) | | 3.9 |
| Olin 10 G ($g/m^2$) | 0.15 | 0.05 |

Comparative Example C-6

Comparative example C-6 uses as absorption layer A a pure gelatin layer comprising 8.4 $g/m^2$ of gelatin and the same ink receiving layer F as in example 3. This comparative example does not contain any sodium lauryl sulfate.

The test results for these recording sheets are listed in Table 6:

TABLE 6

| Example | Wet sticking | Dry sticking |
|---|---|---|
| 3 | 0 | 3 |
| C-6 | 69 | |

The results in Table 6 show immediately that the example according to the invention does not show wet sticking in contrast to comparative example C-6.

Example 4

The following double layer system (Table 7) was coated onto a transparent polyester support (A=absorption layer at the bottom, F=dye receiving layer at the top) and dried for 60 minutes at a temperature of 30° C. Tylose H10G4, available from Hoechst, Ludwigshafen, Germany was used as hydroxyethylcellulose. The value of pH of layer A was adjusted to 7.5 and the value of pH of layer F to 7.0.

TABLE 7

| Component | A | F |
|---|---|---|
| Gelatin (St 69454) ($g/m^2$) | 7.0 | 1.853 |
| Sodium lauryl sulfate ($g/m^2$) | 1.4 | |
| Hydroxyethylcellulose ($g/m^2$) | | 3.367 |
| Olin 10 G ($g/m^2$) | 0.15 | 0.04 |

Comparative Example C-7

Comparative example C-7 uses as absorption layer A a pure gelatin layer comprising 8.4 $g/m^2$ of gelatin and the same ink receiving layer F as in example 4. This comparative example does not contain any sodium lauryl sulfate.

The test results for these recording sheets are listed in Table 8:

TABLE 8

| Example | Wet sticking | Dry sticking |
|---|---|---|
| 4 | 0 | 3 |
| C-7 | 69 | |

The results in Table 8 immediately show that example 4 according to the invention shows much less wet sticking than comparative example C-7.

Examples 5–8

The following double layer systems (Table 9) were coated onto a transparent polyester support (A=absorption layer at the bottom, F=dye receiving layer at the top) and dried for 60 minutes at a temperature of 30° C., wherein F has the same composition as in example 1. The value of pH of layer A was adjusted to 7.5 and the value of pH of layer F to 9.0.

TABLE 9

| | Example | | | |
|---|---|---|---|---|
| Component | 5 | 6 | 7 | 8 |
| Gelatin (St 69454) ($g/m^2$) | 7.63 | 7.0 | 6.72 | 6.46 |
| Sodium lauryl sulfate ($g/m^2$) | 0.77 | 1.4 | 1.68 | 1.94 |
| Olin 10 G ($g/m^2$) | 0.15 | 0.15 | 0.15 | 0.15 |

The test results for these recording sheets are listed in Table 10:

TABLE 10

| Example | Wet sticking | Dry sticking |
|---|---|---|
| 5 | 0 | 4 |
| 6 | 0 | 1 |
| 7 | 0 | 1 |
| 8 | 0 | 2 |

The results in Table 10 immediately show that no wet sticking occurs with different amounts of sodium lauryl sulfate (10, 20, 25 and 30% by weight relative to gelatin). A sodium lauryl sulfate quantity of from 20% by weight to 25% by weight shows the smallest amount of dry sticking.

Example 9

In place of sodium lauryl sulfate of example 5 the sodium salt of hexadecylsulfonic acid, available from Fluka Chemie AG, Buchs, Switzerland, was used.

The test result for this recording sheet is listed in Table 11:

TABLE 11

| Example | Wet sticking | Dry sticking |
|---|---|---|
| 9 | 0 | 3 |

The result in Table 11 immediately shows that no wet sticking occurs when the sodium salt of hexadecylsulfonic acid is used.

What is claimed is:

1. A recording sheet for ink jet printing comprising a support having coated onto said support at least one ink receiving layer and, between the support and the ink receiving layer, a gelatin or substituted gelatin containing absorption layer, characterized in that the absorption layer comprises a micelle forming compound selected from salts of branched or unbranched alkyl sulfates of formula $C_nH_{2n+1}OSO_3H$, wherein n is from 5 to 25;

salts of branched or unbranched alkyl phosphates of formula $C_nH_{2n+1}OPO_3H_2$, wherein n is from 5 to 25;

substituted phenols of general formula (I)

(I)

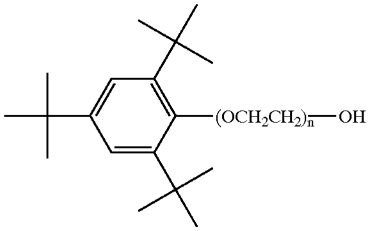

wherein n is from 18 to 50;

or salts of substituted phenols of general formula (II)

(II)

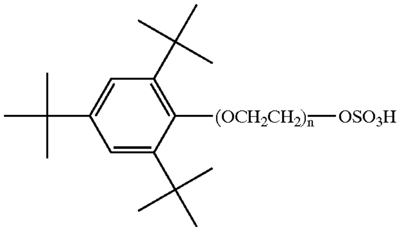

wherein n is from 5 to 55; and wherein said micelle forming compound is present in an amount of at least 20 weight percent relative to gelatin and said ink receiving layer consists of a binder and at least one material selected from the group consisting of dye fixing agents, crosslinking agents, defoamers and pH regulating agents.

2. A recording sheet according to claim 1 characterized in that the absorption layer comprises as micelle forming compound unbranched alkyl sulfates of formula $C_nH_{2n+1}OSO_3H$, wherein n is from 5 to 25, or unbranched alkyl phosphates of formula $C_nH_{2n+1}OPO_3H_2$, wherein n is from 5 to 25.

3. A recording sheet according to claim 1 characterized in that the absorption layer comprises as micelle forming compound unbranched alkyl sulfates of formula $C_nH_{2n+1}OSO_3H$, wherein n is from 8 to 16.

4. A recording sheet according to claim 3 characterized in that the absorption layer comprises as micelle forming compound the alkyl sulfate of formula $C_{12}H_{25}OSO_3^-M^+$, wherein M is a metal cation selected from Na, K, Mg/2, Ca/2, Ba/2, La/3.

5. A recording sheet according to claim 1 characterized in that the absorption layer comprises the micelle forming compound in a quantity of 10 to 50 weight percent relative to gelatin.

6. A recording sheet according to claim 1 characterized in that the absorption layer comprises the micelle forming compound in a quantity of 15 to 45 weight percent relative to gelatin.

7. A recording sheet according to claim 1 characterized in that the absorption layer comprises the micelle forming compound in a quantity of 20 to 40 weight percent relative to gelatin.

8. A recording sheet according to claim 1 characterized in that the absorption layer has a dry thickness from 3 μm to 20 μm.

9. A recording sheet according to claim 1 characterized in that the gelatin is a limed bone gelatin.

* * * * *

UNITED STATES PATENT AND TRADEMARK OFFICE

CERTIFICATE OF CORRECTION

PATENT NO. : 6,420,016 B1
DATED : July 16, 2002
INVENTOR(S) : Peternell et al.

It is certified that error appears in the above-identified patent and that said Letters Patent is hereby corrected as shown below:

Column 5,
Line 1, after "carboxymethylcellulose", delete "β-" and insert -- α- --.

Column 7,
Line 65, delete "300ºC" and insert -- 30ºC --.

Column 9,
Line 18, after "F" delete "." and insert -- , --.
Line 42, delete "300ºC" and insert -- 30ºC --.

Signed and Sealed this

Twenty-ninth Day of October, 2002

*Attest:*

JAMES E. ROGAN

*Attesting Officer* *Director of the United States Patent and Trademark Office*

UNITED STATES PATENT AND TRADEMARK OFFICE

CERTIFICATE OF CORRECTION

PATENT NO. : 6,420,016 B1 
DATED : July 16, 2002
INVENTOR(S) : Peternell et al.

It is certified that error appears in the above-identified patent and that said Letters Patent is hereby corrected as shown below:

Title page,
Item [56], References Cited, after "428/318.4" insert
-- 5,372,884 A * 12/94 Abe et al. ............... 428/331 --.

Signed and Sealed this

Twenty-fourth Day of December, 2002

JAMES E. ROGAN
*Director of the United States Patent and Trademark Office*